(12) United States Patent
McIlrath

(10) Patent No.: US 6,741,198 B2
(45) Date of Patent: May 25, 2004

(54) HIGH RESOLUTION, LOW POWER, WIDE DYNAMIC RANGE IMAGER WITH EMBEDDED PIXEL PROCESSOR AND DRAM STORAGE

(75) Inventor: Lisa G. McIlrath, Lexington, MA (US)

(73) Assignee: R3 Logic, Inc., Somerville, MA (US)

( * ) Notice: Subject to any disclaimer, the term of this patent is extended or adjusted under 35 U.S.C. 154(b) by 0 days.

(21) Appl. No.: 10/174,248

(22) Filed: Jun. 18, 2002

(65) Prior Publication Data

US 2002/0196170 A1 Dec. 26, 2002

Related U.S. Application Data

(60) Provisional application No. 60/299,638, filed on Jun. 20, 2001.

(51) Int. Cl.[7] .............................. H03M 1/12; H04N 3/14
(52) U.S. Cl. ........................................ 341/155; 348/308
(58) Field of Search ............................ 341/155; 348/308

(56) References Cited

U.S. PATENT DOCUMENTS

| 5,248,971 A | 9/1993 | Mandl |
| 5,461,425 A | 10/1995 | Fowler et al. |
| 5,665,959 A | 9/1997 | Fossum et al. |
| 5,699,278 A | 12/1997 | Brajovic |
| 5,801,657 A | 9/1998 | Fowler et al. |
| 5,883,830 A | 3/1999 | Hirt et al. |
| 5,920,274 A | 7/1999 | Gowda et al. |
| 5,962,844 A | 10/1999 | Merrill et al. |
| 6,069,377 A | 5/2000 | Prentice et al. |
| 6,130,713 A | 10/2000 | Merrill |
| 6,166,367 A | 12/2000 | Cho |
| 6,271,785 B1 | 8/2001 | Martin et al. |
| 6,330,030 B1 | 12/2001 | O'Connor |
| 6,334,120 B1 | 12/2001 | Shibata et al. |
| 6,362,482 B1 | 3/2002 | Stettner et al. |
| 6,369,737 B1 | 4/2002 | Yang et al. |
| 6,377,303 B2 | 4/2002 | O'Connor |
| 6,552,745 B1 * | 4/2003 | Perner ........................ 348/308 |
| 2001/0050330 A1 * | 12/2001 | Mattison .................. 250/208.1 |

OTHER PUBLICATIONS

D. X. D. Yang, B. Fowler, and A. El Gamal. "A 128 x 128 pixel CMOS Area Image Sensor with Multiplexed Pixel Level A/D Conversion," In *Digest of Technical Papers*, Custom Integrated Circuits Conference, 1996.

S. J. Decker, R. D. McGrath, K. Brehmer, C. G. Sodini, "A 256x256 CMOS Imaging Array with Wide Dynamic Range Pixels and Column–Parallel Digital Output," *IEEE Journal of Solid State Circuits*, 33(12):2081–2091, 1998.

T. Lule, B. Schneider, M. Boehm, Design and Fabrication of a High Dynamic Range Image Sensor in TFA Technology, *IEE Journal of Solid State Circuits*, 34(5):704–711, 1999.

(List continued on next page.)

*Primary Examiner*—Howard L. Williams
(74) *Attorney, Agent, or Firm*—Seywarth Shaw LLP

(57) ABSTRACT

A high-resolution, low-power wide-dynamic-range CMOS imager includes an array of pixel imaging cells, each of which embeds with a pixel transducing circuit at the pixel level a digital arithmetic logic processing circuit and a memory circuit. This permits multi-bit analog-to-digital conversion of an electromagnetic sensor output at the pixel level. The processing and memory circuits are usable on a pixel-parallel basis in conjunction with any type of pixel transducing circuit design that produces a binary output. The pixel processing and memory circuits may be configured with pixel transducing circuits in 2-dimensional arrangements on a single substrate or in 3-dimensional arrangements of three layered substrates, and may be used in multiplexed or non-multiplexed fashion with one or several pixel transducing circuits.

38 Claims, 13 Drawing Sheets

OTHER PUBLICATIONS

D. X. D. Yang, A. El Gamal, B. Fowler, H. Tian, "A 640x512 cmos Image Sensor with Ultrawide Dynamic Range Floating–Point Pixel–Level ADC," *IEEE Journal of Solid State Circuits*, 34(12):1821–1834, 1999.

V. Brajovic, T. Kanade, "A VLSI Sorting Image Sensor: Globally Massively Parallel Intensity–to–Time Processing for Low Latency Adaptive Vision," *IEEE Transactions on Robotics and Automation*, 15(1):67–75, 1999.

W. Yang, "A Wide–Dynamic Range, Low–Power Photosensor Array," In *IEEE International Solid State Circuits Conference*, pp. 230–231, San Francisco, CA, Feb. 1994.

Kleinfelder et al., "A 10,000 Frames/s CMOS Digital Pixel Sensor with Pixel-Level Memory," *In Proceedings of the 2001–IEEE International Solid–State Circuits Conference*, pp. 88–89, San Francisco, CA, Feb. 2001.

\* cited by examiner

HIGH RESOLUTION, LOW POWER, WIDE DYNAMIC RANGE IMAGER WITH EMBEDDED PIXEL PROCESSOR AND DRAM STORAGE

RELATED APPLICATION

This application claims the benefit of the filing date of copending U.S. provisional application Ser. No. 60/299,638, filed Jun. 20, 2001.

BACKGROUND

This application relates to integrated circuit imaging arrays and to the pixel imaging cells which make up such arrays. The invention has particular application to imaging arrays implemented in CMOS technology and which afford high resolution, low power consumption and wide dynamic range.

Solid state imaging systems have been used for a number of years in various types of devices. While many of these systems utilize Charge-Coupled Devices ("CCD") to build the underlying solid state image sensors, CCD-based sensors are limited by their process technology in that CMOS logic circuits cannot be incorporated onto the same substrate. Accordingly, less expensive imaging devices fabricated out of integrated circuits using standard CMOS processes have been developed. Such CMOS imaging devices typically include a light detecting element or sensor, such as a photodiode or photogate, the output of which is an analog signal with a magnitude approximately proportional to the amount of light perceived by the sensor. It is known to form such light detecting elements in a core array which is addressable by row and column. An analog-to-digital-converter ("ADC") may then be used to convert the analog signals to digital signals. Typically, the processing and storage capabilities utilized in the analog-to-digital conversion are located outside the sensing array, either on or off the chip. This has certain inherent disadvantages, particularly as regards scaling up the imaging array.

Efforts have heretofore been made to effect processing and/or storage within the imaging array at the pixel level. U.S. Pat. No. 6,362,482 discloses a detector based on counting charges or photons, which implements focal-plane pixel-parallel processing. However, in this device all processing is done in the analog domain, and there is no digital logic circuitry.

U.S. Pat. No. 6,271,785 discloses a CMOS imager which performs analog-to-digital conversion at the pixel cell level by comparing photodiode voltage to a ramp voltage. However, the ramp voltage is generated outside the array and the memory used to store the counter value is disposed outside the array. Kleinfelder et al., in a paper entitled "A 10,000 Frames/s CMOS Digital Pixel Sensor with Pixel-Level Memory", in Proceedings of the 2001-IEEE International Solid-State Circuits Conference, pages 88–89, San Francisco, Calif., February, 2001, describes a high-speed digital pixel sensor which incorporates single bit analog-to-digital conversion and embedded DRAM storage at the pixel level. The pixel incorporates a photosensor that integrates its current onto a capacitor to produce a voltage, which is compared at the pixel level with a ramped reference voltage signal which is generated external to the array. The device utilizes 3-transistor DRAM cells, which are not refreshable. The pixel is simply an on-off switch timer pixel and would not work with other types of pixels, such as an oscillator pixel.

SUMMARY

There is disclosed in this application an integrated circuit imaging system which avoids the disadvantages of prior systems while affording additional structural and operating advantages.

An aspect is the provision of an imaging system which accommodates a very wide dynamic sensing range.

Another aspect is the provision of an imaging system which is characterized by very low power consumption.

Yet another aspect is the provision of an imaging system which has small unit cell size, permitting high-resolution image arrays within current CMOS process 5× reticle limits.

Yet another aspect is the provision of a system of the type set forth, which affords linear scaling of power consumption with the number of pixels in the array.

A still further aspect is the provision of a system of the type set forth, which provides multi-bit analog-to-digital conversion by pixel-parallel processing.

In connection with the foregoing aspect, another aspect is the provision of a system of the type set forth, which provides arithmetic logic operations embedded within the pixel processor.

A still further aspect is the provision of a system of the type set forth, which provides multi-bit, refreshable, single-transistor, differential DRAM data storage per pixel.

Another aspect is the provision of a system of the type set forth, wherein sensor performance is independent of array size.

Certain ones of these and other aspects may be attained by providing a pixel processing and storage cell for use with a plurality of like cells in an integrated circuit imaging array, with each cell adapted to be coupled to a sensing unit having a binary output signal, the cell comprising a digital arithmetic logic processing circuit adapted to receive and process the output signal of an associated sensing unit to a processed multi-bit value, and a memory circuit coupled to the processing circuit and including a plurality of bit storage units for storing the processed value.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
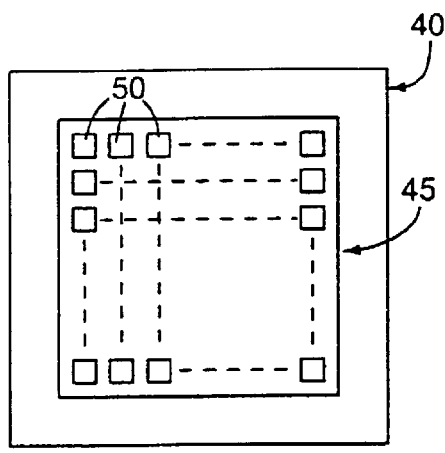
FIG. 1 is a functional block diagrammatic illustration of an integrated circuit imaging chip including an imaging array of pixel imaging cells.

Referring to FIG. 1, there is a diagrammatically illustrated an integrated circuit chip 40, which includes an imaging array 45 containing a plurality of pixel imaging cells 50 arranged in rows and columns, in a known manner. As will be explained more fully below in connection with FIG. 31, the chip 40 typically also includes additional circuitry, including row and column select logic and pixel buffers, not shown in FIG. 1. Each of the pixel imaging cells 50 is designed to detect, process and capture a single pixel, i.e., a single point or fundamental element in a graphic image, the array of all of such points making up the complete image.

Figure 2:
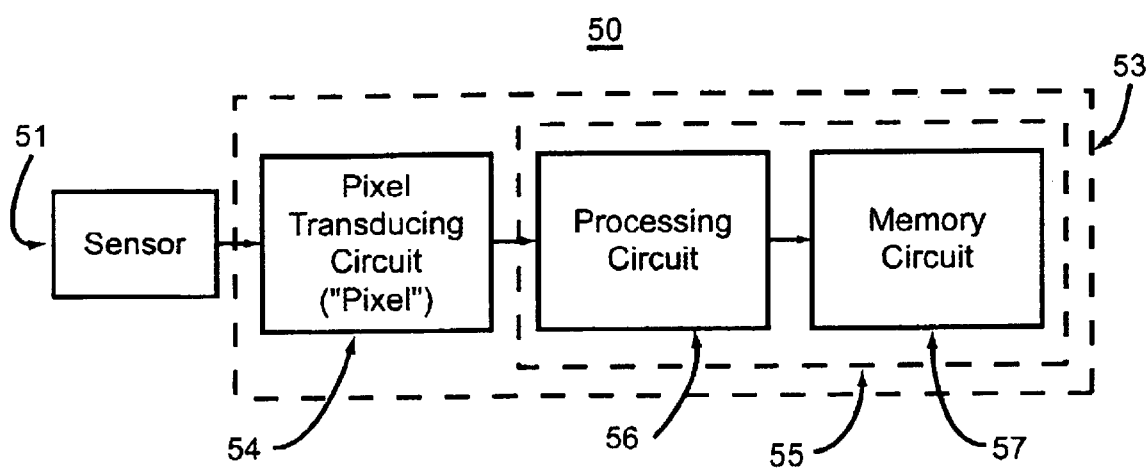
FIG. 2 is a functional block diagrammatic illustration of one of the pixel imaging cells of the imaging array of FIG. 1.

All of the pixel imaging cells 50 are substantially the same, one such cell being illustrated in FIG. 2. The pixel imaging cell 50 includes a sensor 51, which may be a visible light sensor, such as a photodiode 52 (see FIG. 3), but could be any of a variety of different types of electromagnetic sensors, depending on the type of radiation making up the image. Thus, for example, the sensor 51 could be a different type of visible light sensor or a sensor for non-visible radiation, such as microbolometer for sensing infrared radiation, an amorphous selenium or silicon detector responsive to x-ray photons, a quantum-well infrared photo detector ("QWIP") or a micro-machined solid-state "antenna" detector for microwave or millimeter-wave sensing. The output of the sensor 51 is applied to a pixel capture cell 53 and, more specifically, to a pixel transducing circuit 54 within the cell 53. (It should be noted at this point that the term "pixel" is used herein in two different senses: 1) to refer to the fundamental element or point of an image, as explained above, and 2) as a shorthand term for the pixel transducing circuit 54.) The "pixel" or pixel transducing circuit 54 is the circuitry directly connected to the photo-sensing element that provides a first level of transduction from the sensor signal to the intermediate electrical quantities used to complete an analog-to-digital conversion operation. The pixel transducing circuit or "pixel" 54 could be any of a number of known types, as will be explained more fully below, as long as it produces a binary output signal. That binary output signal is then applied to a pixel processing and storage cell 55 and, more specifically, to a processing circuit 56 within the cell 55. The processing circuit 56, details of which will be explained more fully below, converts the output of the pixel 54 to a processed digital multi-bit value, which is then stored in a memory circuit 57 of the pixel processing and storage cell 55.

The imaging array 45 may be arranged so that each pixel imaging cell 50 is substantially identical to that illustrated in FIG. 2, but that need not be the case. For example, the pixel imaging cells 50 could be arranged in a multiplex format so that, e.g., a single processing circuit 56 is shared by plural sensors 51, pixels 54 and memory circuits 57, and specific such multiplex arrangements will be explained more fully below.

While principles disclosed in this application may apply generally to integrated circuit imaging arrays and pixel imaging cells, the embodiments specifically described below are designed to be implemented on CMOS substrates, either on a monolithic two-dimensional ("2D") CMOS substrate, or on multiple substrates that are subsequently combined into a three-dimensional ("3D") CMOS device. More specifically, the circuits described herein have been laid out in accordance with design rules for the 0.25 mm CMOS process offered by Taiwan Semiconductor Manufacturing Corp. ("TSMC") through the Metal Oxide Semiconductor Integrated Services ("MOSIS") service. Both 2D and 3D implementations are designed for visible light (400 nm–700 nm wavelength) imaging with silicon photodiode sensors although, as was noted above, the circuits may be applied to other types of detectors, provided that the appropriate detector may be integrated and electrically connected in some fashion to the CMOS pixel transducing circuit 54.

In order to maximize dynamic range sensitivity, the pixel 54 may be an "integration-time"-mode pixel design used in conjunction with an embedded digital processing circuit 56. The key distinguishing feature of such pixels is that their output is related to the time required for a photocurrent to reduce the voltage stored on a sense node capacitance by a specified amount. Several variations on the circuit architectures for integration-time mode pixel designs may be employed with the embedded digital processing circuit 56 unit described in detail below. All such architectures, however, will fall into one of two categories: those that convert the photosensor signal into a frequency, and those that output a pulse width proportional to the integration time. The implementations of each type used in 2D and 3D demonstration devices are described below.

Figure 3:
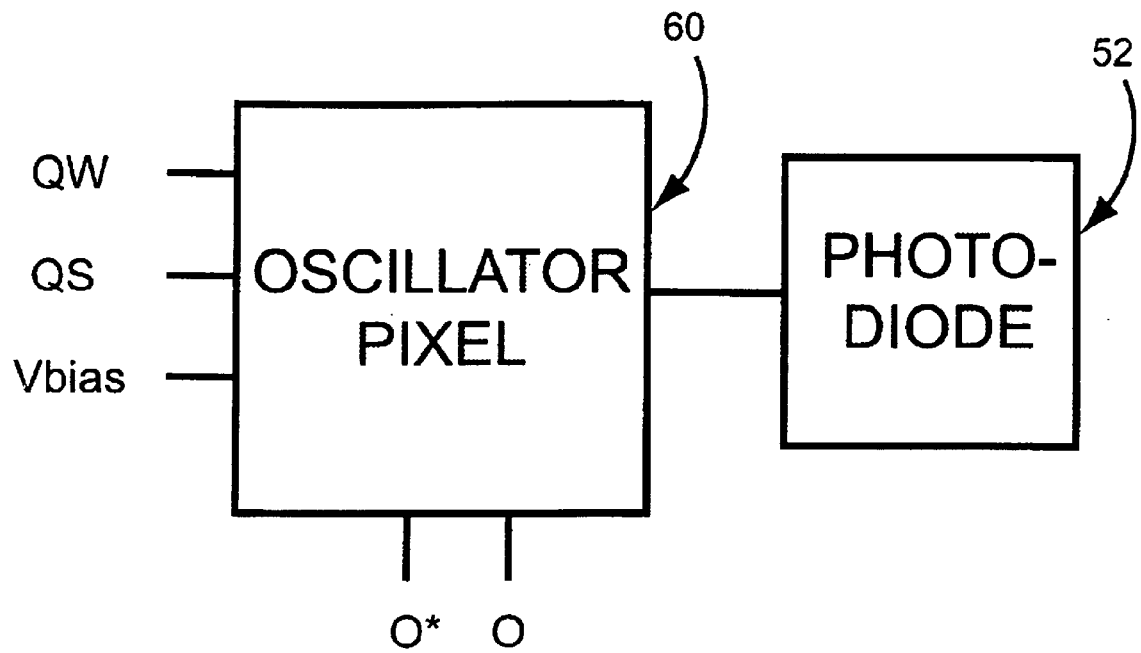
FIG. 3 is a functional block diagrammatic illustration of a portion of the pixel imaging cell of FIG. 2.
Figure 4:
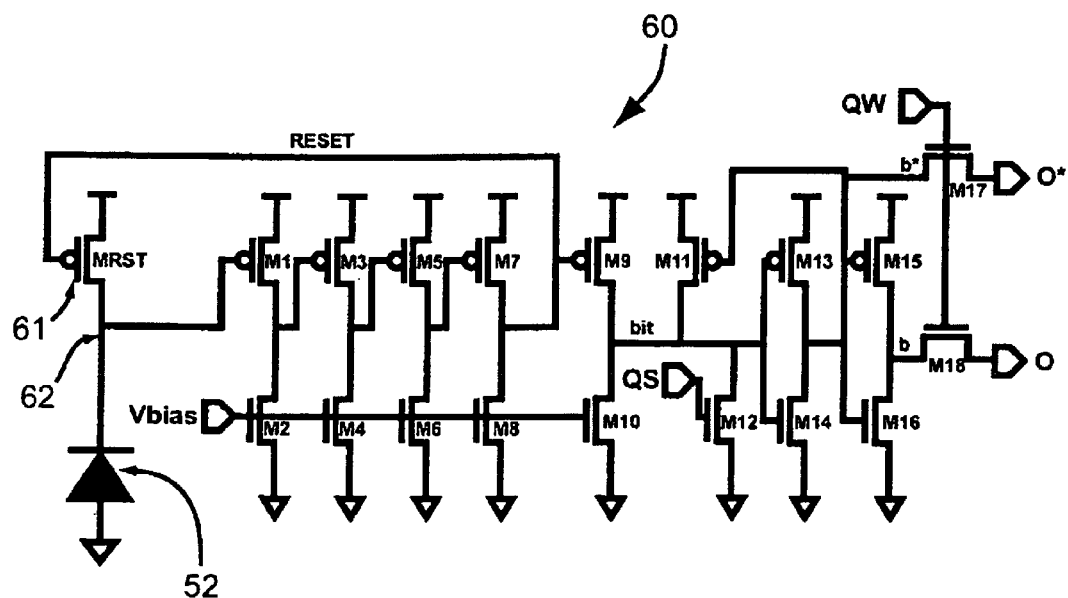
FIG. 4 is a schematic diagram of the oscillator pixel of FIG. 3.

FIGS. 3 and 4 illustrates an "oscillator" pixel 60, which outputs a stream of brief pulses at a frequency determined by the magnitude of the sensor signal. In FIG. 4, a low power oscillator circuit used in conjunction with a silicon n-type photodiode 52 is shown. The photodiode 52 generates a current proportional to the light incident on its collection area. During most of the oscillation period, the voltage on the gate 61 of the PFET MRST—labeled as the signal RESET—is at Vdd so that the transistor is OFF. During this time the photodiode 52 is isolated from a supply of positive charge, and the photogenerated electrons accumulating on the diode's emitter and on the gate of M1 reduce the voltage at this node 62 in proportion to the total capacitance.

The NFET's M1–M8 make up a set of four "current-starved" inverters connected in series. The voltage Vbias, which is connected to the gates of the NFETs, is typically set to a few millivolts above ground such that these transistors are biased in the weak inversion region and draw at most a few nanoamperes of current. The use of current-starved inverters is an important aspect of the oscillator design, as it is critical to low power operation. These inverters are characterized by a rapid rise time, slow fall time, and a high transition point—the input value at which the output enters the high gain region in crossing over between valid states—of essentially one PFET threshold drop (Vtp) below Vdd.

Once the photocurrent reduces the voltage on the gate of M1 to Vdd−Vtp, the inverters in the chain begin to switch state. The output of the M7–M8 inverter pair—signal RESET—drops, causing PFETs MRST and M9 to turn ON. Connecting the four inverters in this fashion to MRST and the photodiode essentially forms a five-stage ring oscillator circuit, the oscillation frequency of which is determined by the photocurrent. There is enough delay between the four inverters to allow the photodiode voltage to rise to Vdd before the effect of the change in output of the M1–M2 inverter pair forces the RESET voltage back to Vdd, turning off MRST. Because of the high transition point and slow fall times of the current-starved inverters, the output voltage of each stage swings only from Vdd to Vdd−Vtp, resulting in very low switching power consumption. As the I/C ratio of the photodiode is much smaller than that of the inverters, the time to discharge the sense node 62 essentially determines the oscillation period.

Transistors M9–M18 serve to interface the oscillator pixel 60 to the embedded digital processing circuit 56. Analog-to-digital conversion is effected by analyzing the number of times that the oscillator completes a full integration cycle in a given time period. When an oscillation cycle completes, the drop in the RESET voltage turns on both transistors MRST and M9. In the latter case, the drain of M9, labeled "bit," is connected also to the input of the ordinary CMOS inverter pair M13–M14 and the drain of the pull-up transistor M11. The feedback between the output of the M13–M14 inverter and the gate of M11 then causes the node voltage "bit" to "lock" at Vdd. The "bit" voltage is reset to ground by pulsing external signal QS high, as the NFET pull-down transistor M12 is designed to overpower the pull-up transistor M11. Since the low state of "bit" is not held by feedback, transistor M10, biased into the weak inversion region by Vbias, provides enough standby current to prevent leakage currents from PFETs M9 or M11 from pulling "bit" into the high state in the absence of an actual oscillator reset.

Sampling of the bit values onto the embedded digital processing and storage cell 55 occurs when control signal QW is brought high for one clock cycle, after which signal QS is brought high for one cycle. CMOS inverters M13–M14 and M15–M16 act as buffers to drive the value of the "bit" node differentially onto the digital processing and storage cell 55 through signals O and O*. The QW-QS sequence is repeated at regular intervals, at a frequency greater than the pixel oscillation frequency. If the photocurrent-driven oscillator has reset since the last sample, "bit" will be in the high state (logic "1") when it is sampled; otherwise it will be at ground (logic "0").

Figure 5:
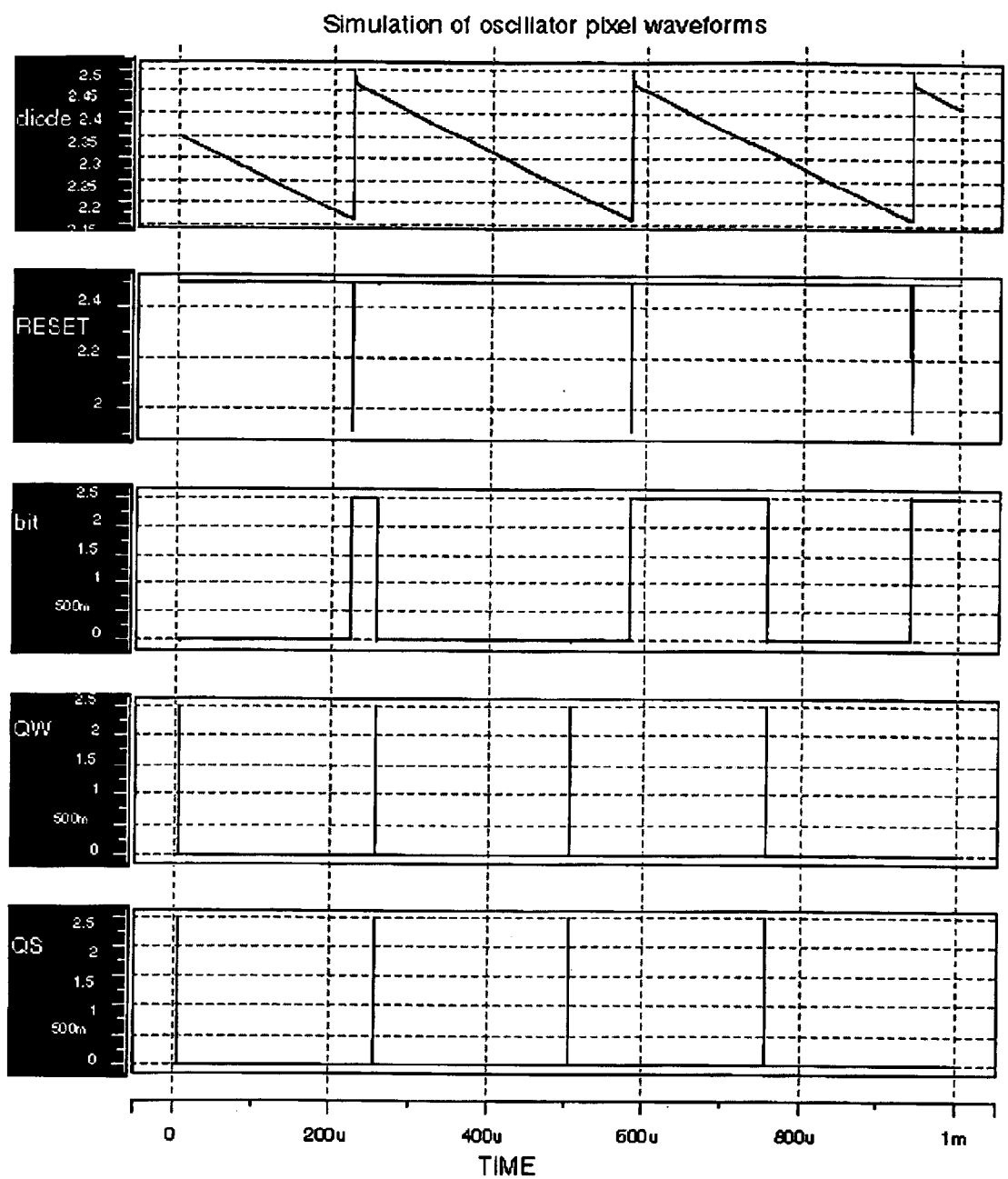
FIG. 5 is a waveform diagram illustrating the operation of the oscillator pixel of FIG. 4.

Timing waveforms for the control signals, along with simulated sense, RESET, and "bit" node voltages for the A pixel layout in the 0.25 micron 2.5V TSMC process are shown in FIG. 5. It should be noted that several variations on the oscillator pixel design are possible. One alternative design is described in L. McIlrath, "A Low Power, Low Noise, Wide Dynamic Range CMOS Imager with Pixel Parallel A/D Conversion" IEEE Journal of Solid State Circuits, 36(5), pp. 846–853 (2001). The present structure was chosen for its low power and low voltage swing requirements.

Figure 6:
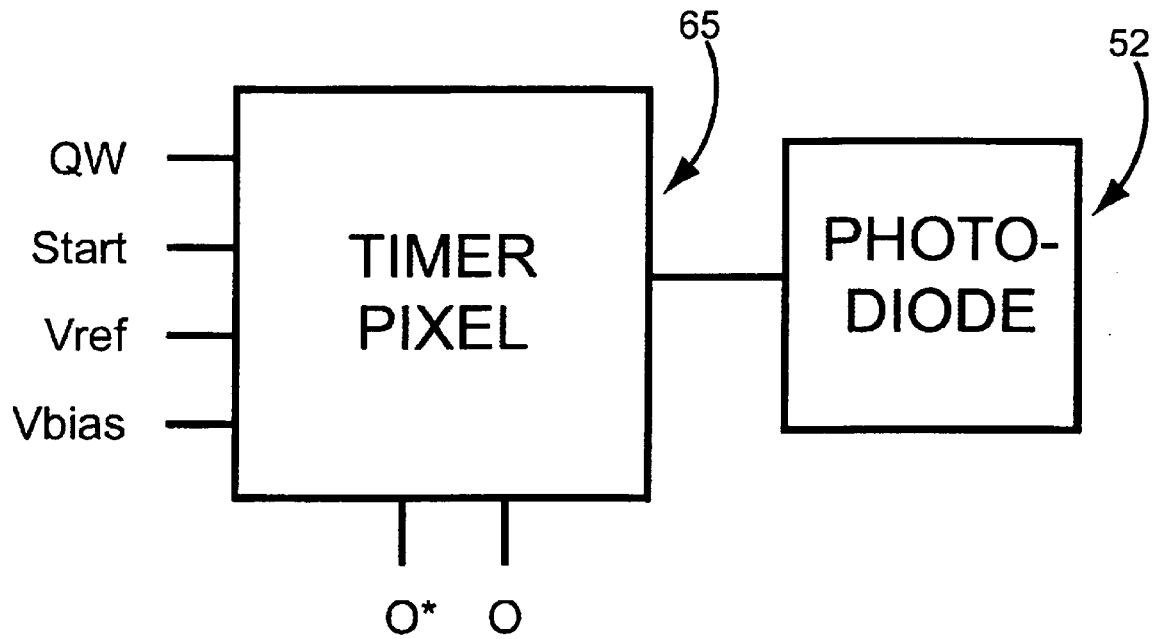
FIG. 6 is an illustration similar to FIG. 3 illustrating a different type of pixel.
Figure 7:
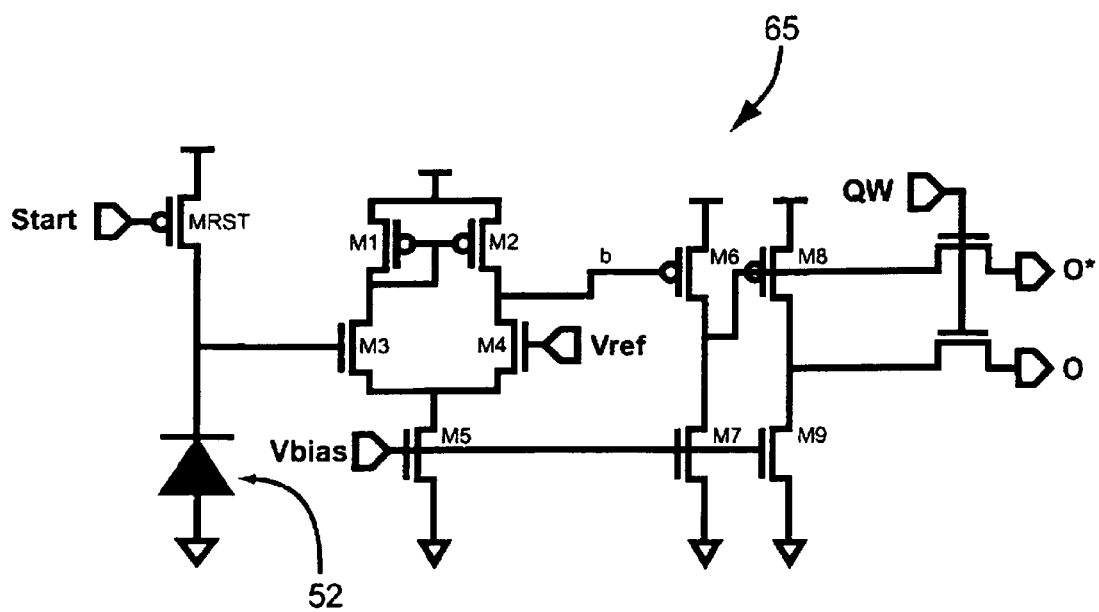
FIG. 7 is a schematic diagram of the pixel of FIG. 6.

FIGS. 6 and 7 illustrate a "timer" pixel circuit 65 which uses a global Start signal to synchronize the beginning of the photocurrent integration period with the system master clock. This is in contrast to the free-running oscillator pixel of FIGS. 3 and 4, which is unsynchronized with the master clock. The sense node 66 in this design is connected to the non-inverting input of a differential amplifier, which is used as a comparator. By comparing the sense node voltage to a known reference, Vref, common to all pixels, the intention is to reduce the effects of variation in transistor threshold voltages on pattern noise in the imaging array 45.

In the oscillator pixel 60 of FIG. 5, the threshold voltage of the first inverter input sets the voltage integration range. Photon shot noise in the photodiode 52 and FET noise at the input gate 61 will also cause random variations in the oscillator period, translating into phase noise in the pixel frequency. Because many periods need to be sampled to accurately estimate the average frequency, it is desirable to have a short integration period. In the timer pixel 65, however, a single integration cycle is measured, and hence it is desirable to increase the integration voltage to make this measurement as accurate as possible.

Figure 8:
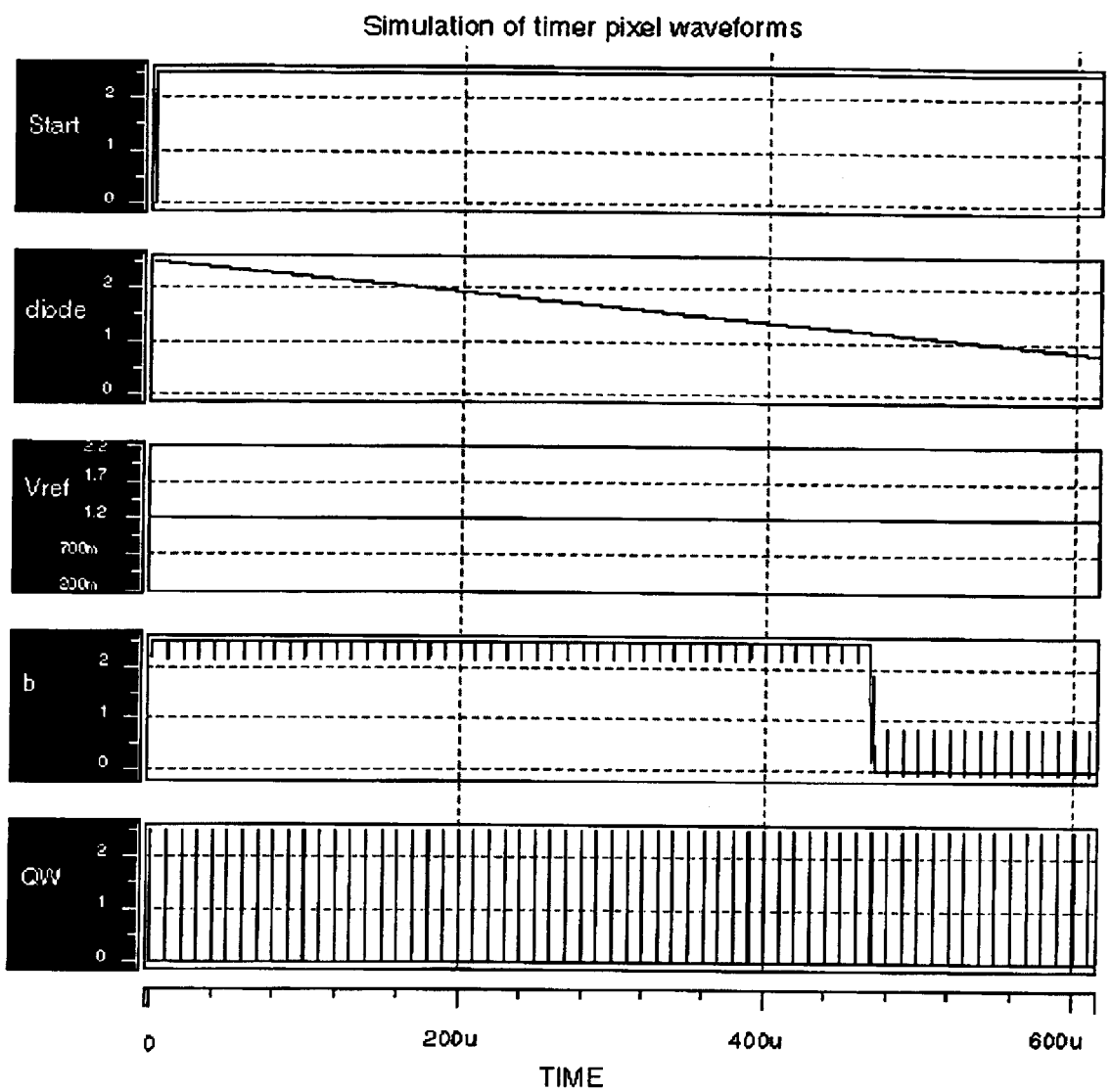
FIG. 8 is a waveform diagram illustrating operation of the pixel of FIG. 7.

To reduce power in the timer pixel 65 the differential amplifier, composed of FETs M1–M5, is operated in the weak inversion region. Current starved inverters M6–M7 and M8–M9 are used to drive the comparator output signal, "b", differentially onto the embedded digital processing and storage cell 55. Sampling is achieved in the same manner as for the oscillator pixel 60, using clocked signals QW and QS. Simulated waveforms for the timer pixel 65 implemented in the 2.5V 0.25 micron TSMC process are shown in FIG. 8.

The embedded digital processing and storage cell 55 includes memory circuit 57, which contains N bits of differential DRAM storage per pixel, and also includes sensing circuitry to read and refresh the pixel memory, a ½-adder combinational logic circuit, and static latches to hold the current logic state and update the memory. This section describes the design and control signal timing of each major component of the cell 55. In the next section, the method of arranging the pixels 54 and processing and storage cells 55 into a regular array is described.

Figure 9:
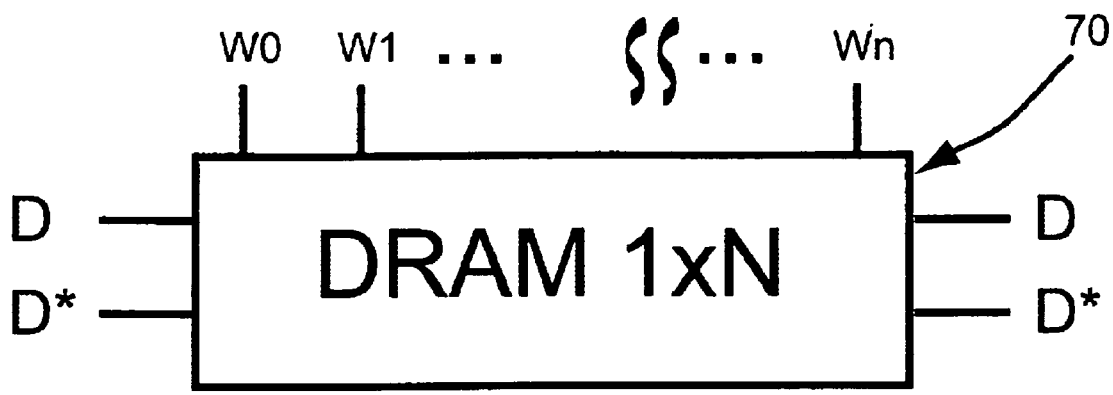
FIG. 9 is a block diagrammatic illustration of a storage circuit of the pixel imaging cell of FIG. 2.
Figure 10:
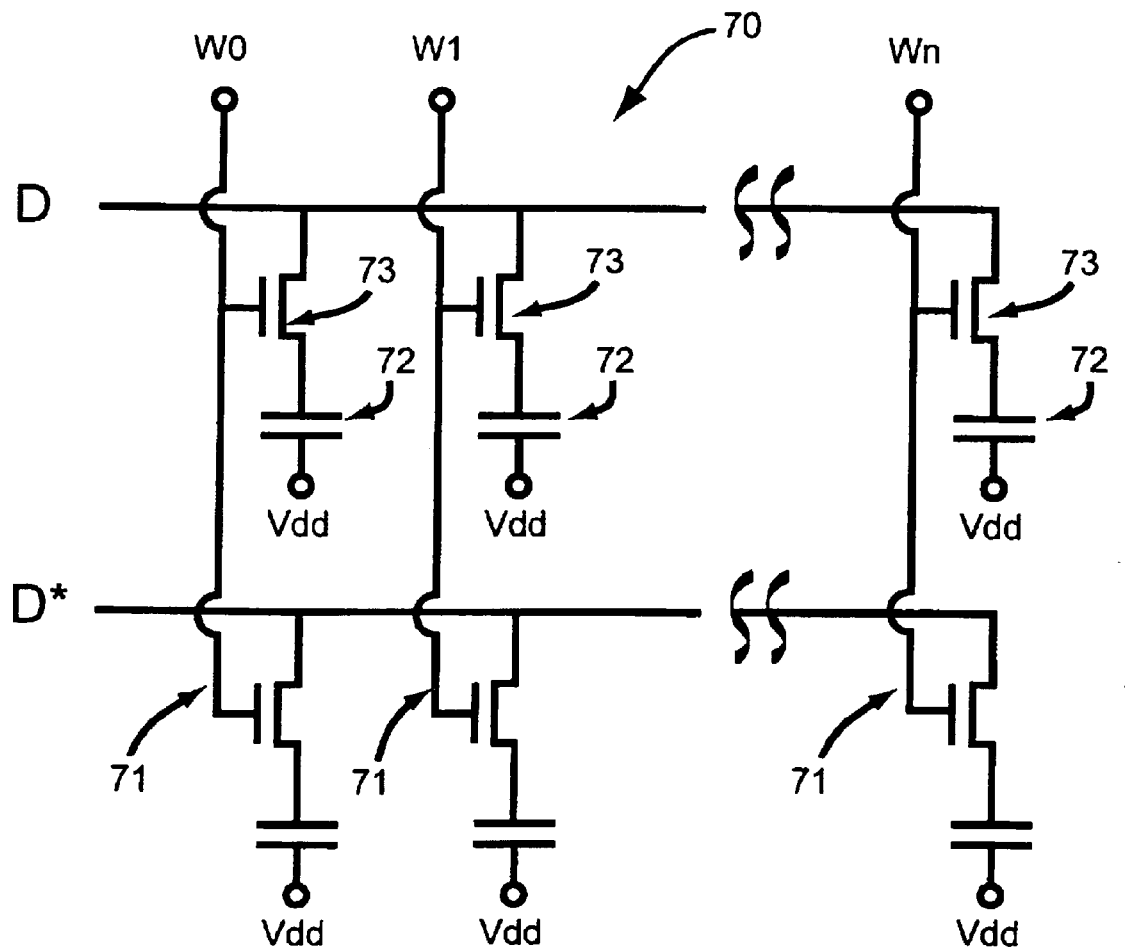
FIG. 10 is a schematic diagram of the storage circuit of FIG. 9.

The present implementation of the pixel memory circuit 57 is illustrated in FIGS. 9 and 10 and contains 8 bits of DRAM storage 70. The number of bits is imposed only by unit cell size considerations. Nothing in the design other than the area required prevents it from containing more or fewer bits. The memory architecture for each pixel is shown in FIG. 10. Bits are stored differentially on 1-transistor DRAM cells 71, in which storage capacitance 72 is the source-drain diffusion and channel capacitance of an NFET device whose gate is connected to Vdd. The storage capacitors are connected to the data lines, D and D*, through NMOS pass transistors 73, the gates of which are driven by word lines W0–W7. A bit and its complement are loaded into a given differential cell pair by setting lines D and D* to the appropriate values and then bringing the corresponding word line high to charge the cell capacitance. The quantities are stored by subsequently bringing the word line low to isolate the cell capacitances from the data lines. A logic "1"

is represented by setting D to a high voltage close to Vdd and line D* to ground. A logic "0" is represented by reversing these settings.

Figure 11:
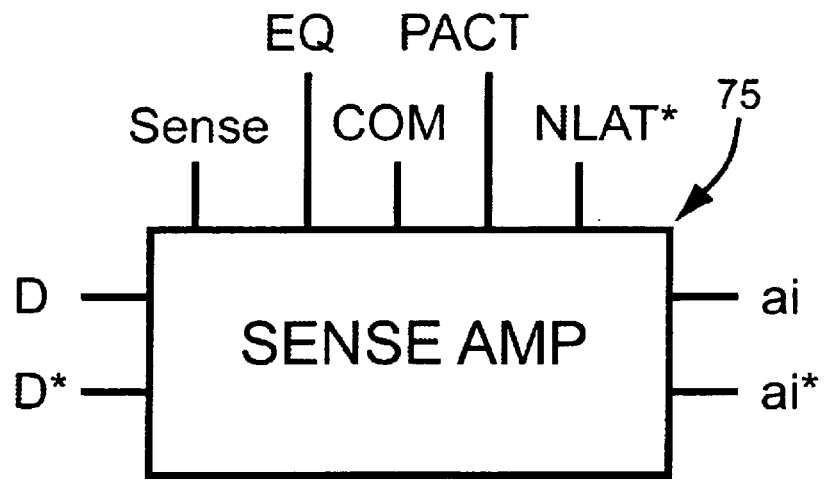
FIG. 11 is a block diagrammatic illustration of a sense amplifier circuit portion of the processing circuit of the pixel imaging cell of FIG. 2.
Figure 12:
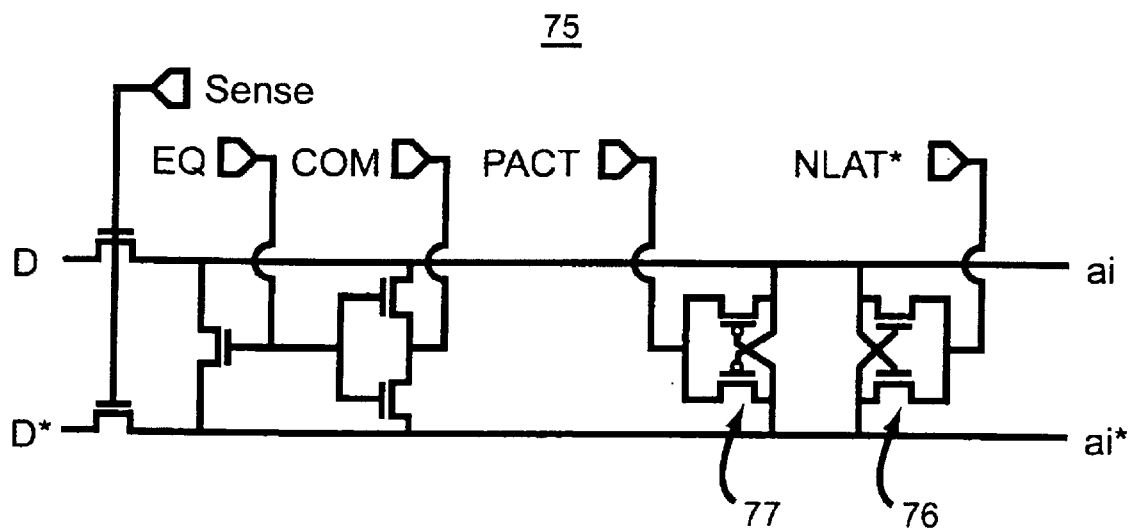
FIG. 12 is a schematic diagram of the sense amplifier circuit of FIG. 11.
Figure 13:
FIG. 13 is a waveform diagram illustrating operation of the sense amplifier circuit of FIG. 12 in reading 8 bits of data from the storage circuit.

Reading the data stored in the DRAM cells 71 requires sharing the stored charge between the small cell capacitances and the data line capacitance, then amplifying the resulting differential voltage to valid high and low logic levels. Standard techniques are used to accomplish this function in the sense amplifier circuit 75 of FIGS. 11 and 12, implemented in the embedded processing circuit 56. The data lines D and D* are gated to the sense amplifier circuit 75 by raising signal Sense to Vdd. Before accessing the cell to be read, the data line voltages are first equalized to an intermediate level between Vdd and ground—carried on global line COM—by pulsing signal EQ high, then low. The wordline (W0–Wn) corresponding to the bit to be read is then raised so that the charge in the cells is shared onto the precharged data lines, creating a small differential voltage between D and D*. Before amplification, both of the voltages NLAT* and PACT, which are connected to the supply rails of the sense amplifier circuit 75, are allowed to float. (Externally, a switch is opened to disconnect the NLAT*/PACT pins from their respective supplies.) NLAT* is brought low first to enable the greater drive current of the NMOS transistors to pull the lower of the two data lines to ground. PACT is raised to Vdd on the following clock cycle to complete the amplification of the higher signal toward Vdd. To ensure proper evaluation, the COM voltage should be only slightly higher than the NMOS threshold voltage (~0.8V for the TSMC 2.5V process). Timing waveforms for the 2.5V TSMC process for reading/refreshing 8 bits of memory are shown in FIG. 13. For this simulation a master clock frequency of 10 MHz is assumed, such that one clock cycle equals 100 ns. There is nothing in the design to limit operating at higher clock frequencies. 10 MHz was chosen to make the time intervals easy to divide into clock cycles. Six clock cycles are required to refresh one bit; 48 to refresh an 8-bit memory block. The label Wn represents any of the word lines W0–W7.

Figure 14:
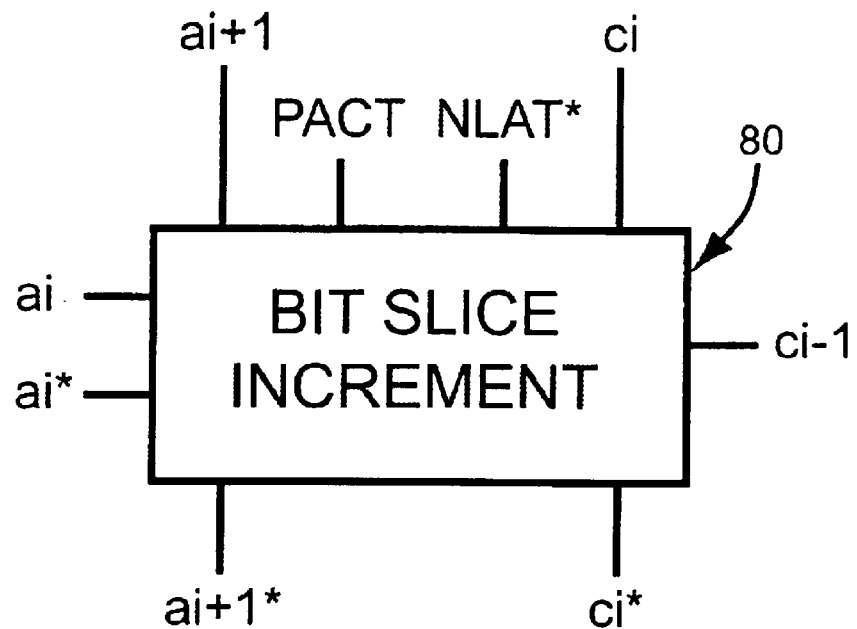
FIG. 14 is a block diagrammatic illustration of a bit slice increment logic circuit in the processing circuit of the pixel imaging cell of FIG. 2.
Figure 15:
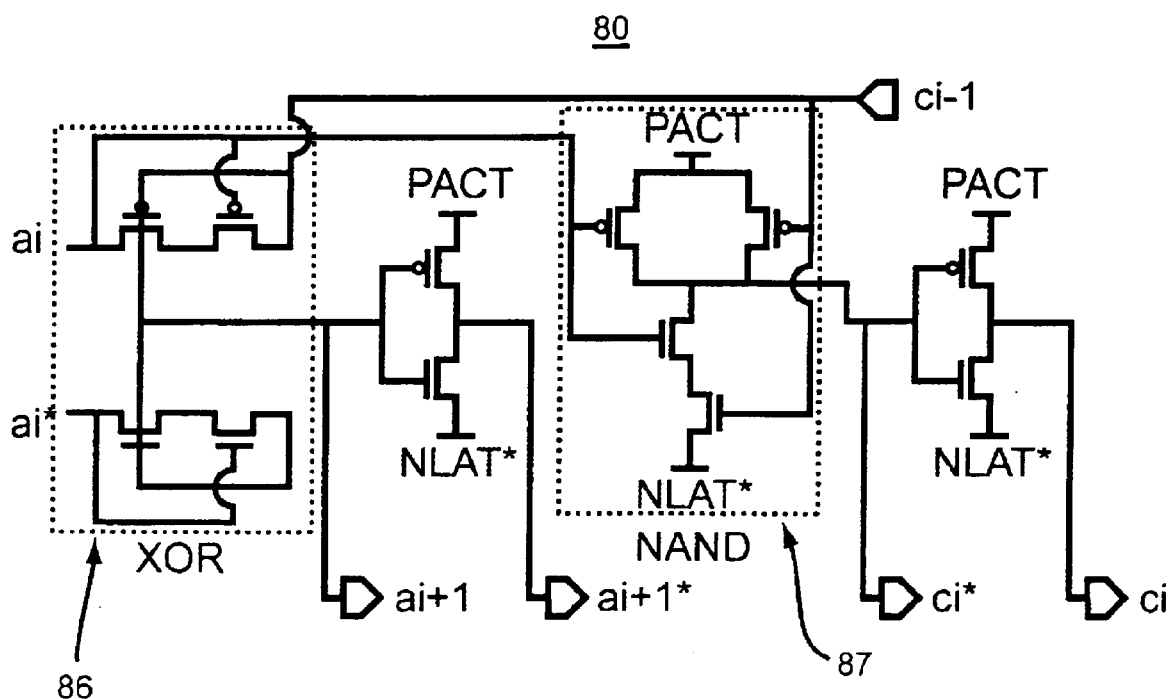
FIG. 15 is a schematic diagram of the bit slice increment logic circuit of FIG. 14.

The outputs of the sense amplifier circuit 75 labeled ai and ai* are used in conjunction with the counter or bit-slice increment logic circuit 80 shown in FIGS. 14 and 15. This circuit contains the combinational logic equivalent to a 1-bit half-adder cell. A half-adder takes inputs $a_1$ and $a_{i-1}$ to produce outputs $a_{i+1}$ and $c_i$ according to the update equations:

$$a_{i+1} = a_1 \oplus c_{i-1} \quad (1)$$

$$c_i = a_i \cdot c_{i-1} \quad (2)$$

The circuit corresponding to the $\oplus$ (XOR) operation is outlined in the dashed rectangle 86 on the left. The · (AND) operation is performed using the NAND circuit (outlined in dashed box 87 on right) followed by an inversion. Because all signals are represented differentially for better noise rejection, both $a_{i+1}$, $c_i$, and their complements $a^*_{i+1}$, $c^*_i$, are generated.

The sense amplifier outputs are only held at valid logic levels when voltages PACT and NLAT* are brought to their respective high and low supply rail voltages. The bit-slice increment logic transistors are thus driven also by the voltages PACT and NLAT*, as opposed to Vdd and ground, so that they are turned off during idle periods. This arrangement also helps reduces power dissipation in the processing circuit 56 by eliminating idle-state leakage currents.

Figure 16:
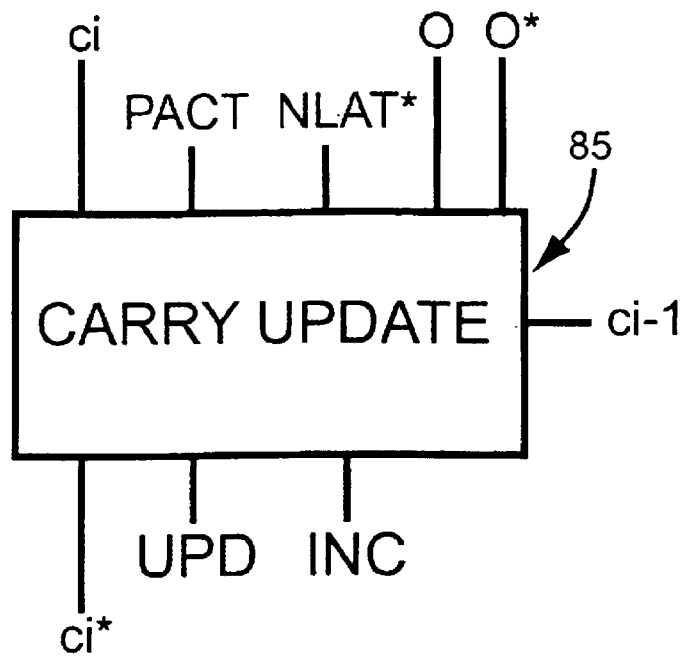
FIG. 16 is a block diagrammatic illustration of the carry update logic circuit of the processing circuit of the pixel imaging cell of FIG. 2.
Figure 17:
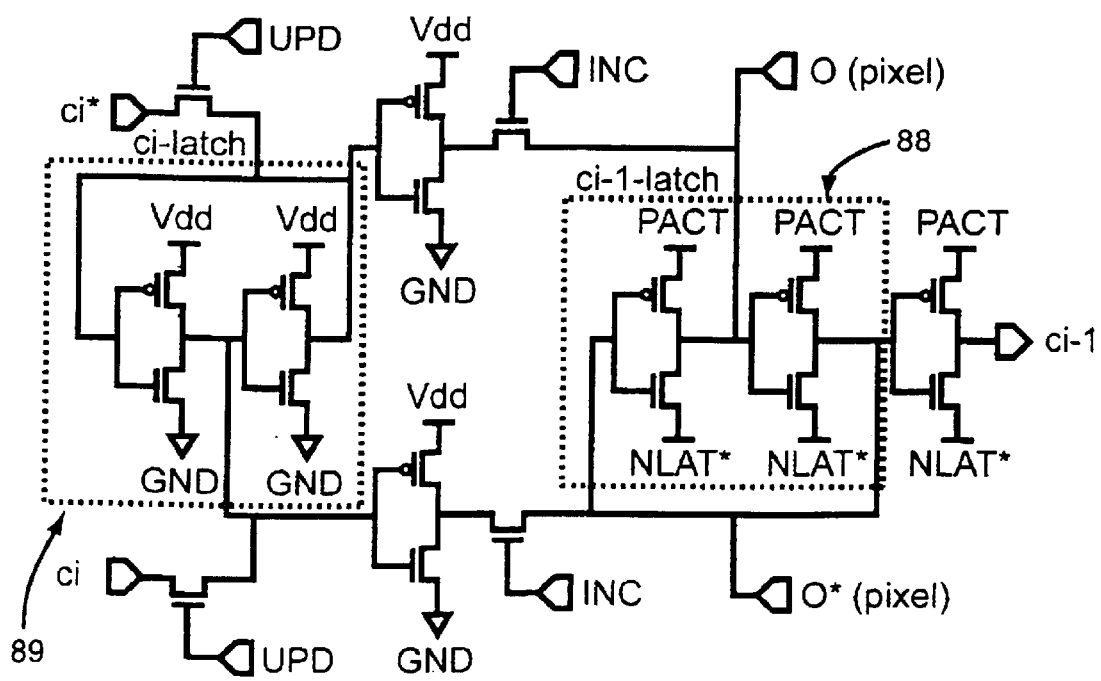
FIG. 17 is a schematic diagram of the carry update logic circuit of FIG. 16.

In order to update the embedded memory with the results of the half-adder computation, it is necessary to preserve the current state values while the new state is being computed. FIGS. 16 and 17 shows the "carry update" logic circuit 85, so called because it is used to latch the value of the carry bit for the next computation. It also provides the interface to the pixel outputs O and O*. The value of the carry input from the previous computation, $c_{i-1}$, is held on the pair of cross-coupled inverters (outlined in the dashed rectangle 88 on the right)—the $c_{i-1}$—latch while the new value, $c_i$, is held on the static latch inverter pair (outlined in the dashed rectangle 89 on the left)—the $c_i$-latch. Because the carry bit must be propagated to the next computation, the $c_i$-latch transistors are driven by the constant supply voltages Vdd and ground. The value of $c_{i-1}$, however, is needed only during the evaluation by the combinational logic, and hence its latch transistors are driven by the variable supplies PACT and NLAT* to reduce power and to avoid presenting conflicting levels to the bit-slice increment logic circuit 80.

When the new values of $c_i$, and $c_i^*$ from the bit-slice increment logic circuit 80 are valid, signal UPD is pulsed high to drive them onto the latch. The bit-slice increment logic circuit 80 is designed to allow it to overdrive the $c_i$-latch to store the new value without affecting the logic results. When the pixel outputs O and O* are sampled, they are driven directly onto the $c_{i-1}$-latch. This arrangement requires that sampling of the pixel be synchronized with the memory read of the sense amplifier circuits 75. When the pixel is sampled, signal INC is held low to avoid a conflict with the $c_i$-latch. When the carry bit is being propagated to the next bit-slice computation, however, the pixel signal QW is held low and the INC signal is synchronized with the memory read.

Figure 18:
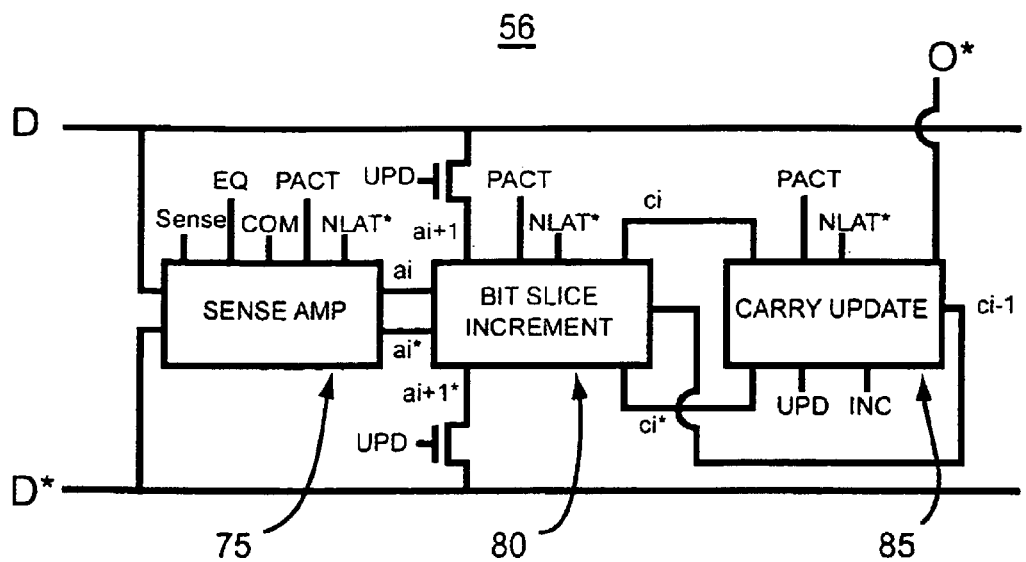
FIG. 18 is a partially block diagrammatic and partially schematic illustration of the processing circuit of the pixel imaging cell of FIG. 2.
Figure 19:
FIG. 19 is a waveform diagram illustrating timing for pixel sampling and word line timing diagrams for memory update of the storage circuit of the pixel imaging cell of FIG. 2.

The complete embedded processing circuit 56, showing the connections between all three main components 75, 80 and 85 is shown in FIG. 18. The control signal timing sequence to sample the pixel output and add it to the contents of the 8-bit memory is shown in FIG. 19. Again, a 10 MHz master clock is assumed.

Eight clock cycles are needed to process each bit. It should be noted that the timing for switching on the NLAT*/PACT sources differs from the pure readout sequence. When either the pixel (by raising QW) or the $c_i$-latch (by raising INC) is connected to the $c_i$-latch, the inputs to the latch are driven by static inverters. These inverters pull current out of the NLAT* node, driving it to ground, and force current into the PACT node, driving it to near Vdd. This action causes not only the $c_{i-1}$, latch to evaluate, but the memory sense amplifier as well. On the clock cycle following the raising of QW or INC, both NLAT* and PACT are simultaneously switched to their respective supplies so that they will maintain the sense amplifier and $c_{i-1}$-latch state through the remainder of the computation. Sense is brought low at the same time that the NLAT*/PACT sources are switched on in order to avoid conflicts on the sense amplifier inputs.

The eight-clock cycle sample-and-count sequence is conservative in that it separates the signals that cause state changes by one full clock cycle. A cycle is inserted between Sense/QW/INC going low and UPD going high; and another UPD going low and Sense going high again. This guarantees that race conditions cannot occur on the busline.

Memory Load

Initial values can be loaded into the pixel memory by driving the bit lines with the data to be loaded and bringing the word lines W0–Wn high in the appropriate order. This operation is the inverse of the data read operation. A full column can be loaded simultaneously by driving all bit lines on all rows of the array. With the data loaded in memory, subsequent operations may be performed.

Decrement

The configuration described above is for counting up. Counting down, i.e., decrementing the memory, can be performed with a trivial change to the logic. A half-subtractor takes inputs $a_i$ and $c_{i-1}$ to produce outputs $a_{i+1}$ and $c_i$ according to the update equations:

$$a_{i+1} = a_i \oplus c_{i-1} \qquad (3)$$

$$c_i = \bar{a}_i \cdot c_{i-1} \qquad (4)$$

The only difference from the half-adder equations (1) and (2) is that $\bar{a}_i$ is used in the carry update equation instead of $a_i$. This change can be accomplished by changing the connection of a single wire in FIG. 15.

The processor need not be operated as a counter. The pixel state can be sampled directly into memory by altering the timing sequence slightly. A logic "0" can be forced onto the sense amplifier by externally driving the data lines D and D* to logic low and high values, respectively, while not cycling the word lines. By applying the sequence of FIG. 19 with W0–W7 maintained at GND until the clock cycle after UPD is brought high, the updated memory value $a_{i+1}$ will be equal to the output value ("0" or "1") of the pixel. For direct sampling also INC should remain low while QW-QS are cycled to sample the pixel value. It should be noted that the pixel state can be read in the inverted fashion by driving D and D* to logic high and low values, respectively. This will force $a_i=1$ and hence $a_{i+1}=c^*_{i-1}$. By loading the memory with a prior value, or inverted value, the processor can perform frame subtraction or local differencing, i.e., computing differences between it and neighboring pixels.

Operations Based on Changing Word Line Order

There is no requirement to just perform a ripple-carry count, where the carry bit propagates through all N bits of the memory. Multiple types of operations can be performed by sequencing only some of the word lines, or sequencing them in different orders. For example, operations can be performed on the bits in memory by forcing the pixel output (O and O*) to a known state, for instance by setting reference voltage Vref (FIG. 7) to Vdd or ground, which will ensure either a logic high or a logic low output. Memory bits can then be read into the processor, with or without inversion, and be operated upon in combination with other bits in the memory. The memory can be partitioned such that part is used for integration and part is used for storage of a previous integration. By changing the timing sequence, the two values can be subtracted from each other, resulting in data compression.

I now describe details of the implementation for a 2D 0.25 micron CMOS process and for a 3D process. I describe how the cells can be efficiently packed by multiplexing the logic circuits in a 2:1 ratio with the pixels and DRAM blocks. The design does not require multiplexing to function. This section is merely to demonstrate that multiplexing can be done for the 2D and 3D layouts.

Because of the area required for the embedded processing and storage cell 55, it is not possible to dedicate a single counter and memory update unit to each pixel 54. This section describes the arrangement of pixels and processors into regular 2D and 3D arrays and the control signal timing to operate the multiplexed cells.

Figure 20:
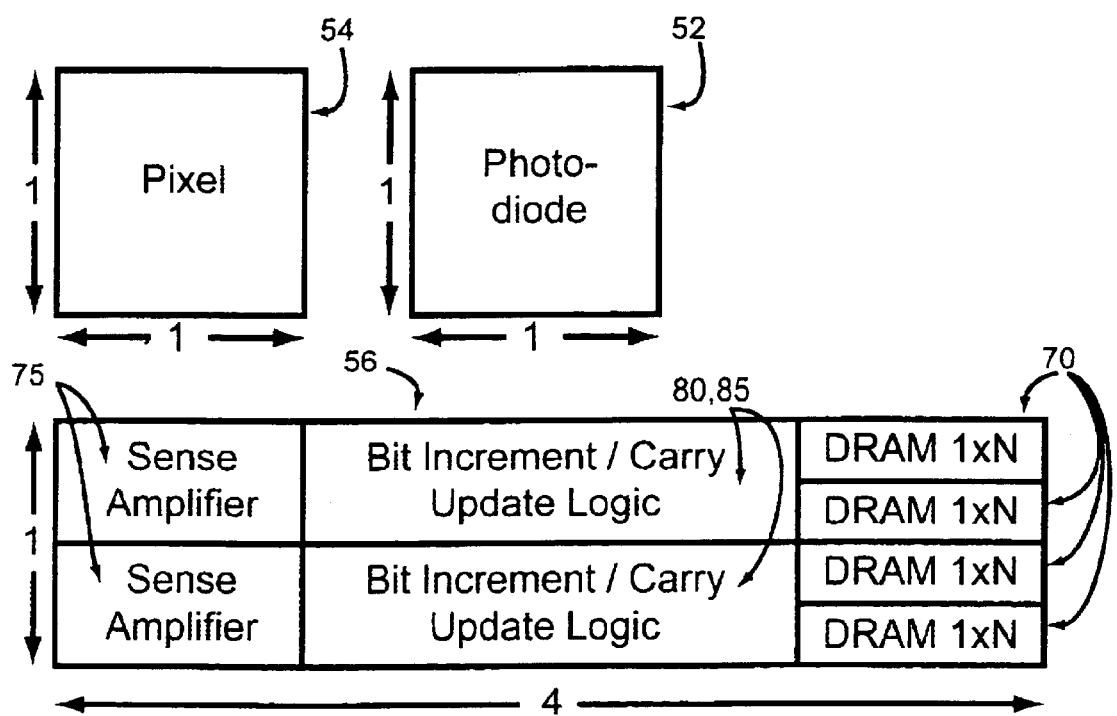
FIG. 20 is a block diagram illustrating the relative sizes of the different circuit cells of the pixel imaging cell of FIG. 2.

Referring to FIG. 20, the pixel 54 layout, excluding the photodiode 52, defines the reference dimension. The pixel 54 is laid out as a square of side defined to be of length 1. The photodiode cell 52, which connects to the pixel 54 either by a metal strap in 2D, or a vertical via in 3D, also has a 1×1 square layout. In these units, the embedded digital processing circuit 56, along with two rows of 8-bit DRAM storage 70, occupies a 2×4 rectangle. In other words, in the space required by four pixels 54, it is possible to fit two digital processing circuits 56 and a 4×8-bit DRAM array. FIG. 20 illustrates the relative sizes of the different cells.

Figure 21:
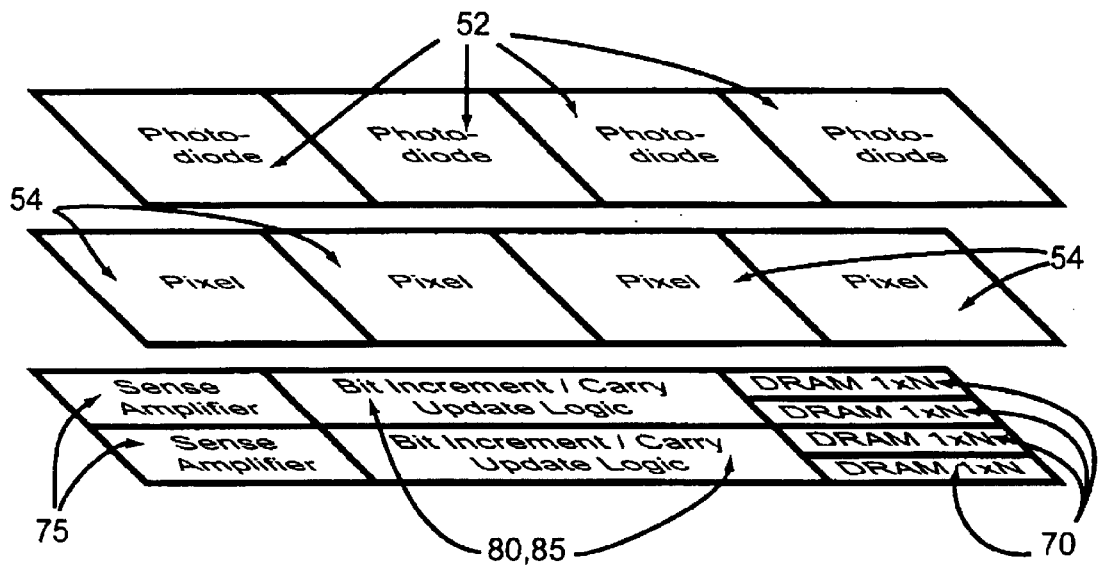
FIG. 21 illustrates the manner in which the cells may be overlayed in a three-dimensional, three-layer layout.
Figure 22:
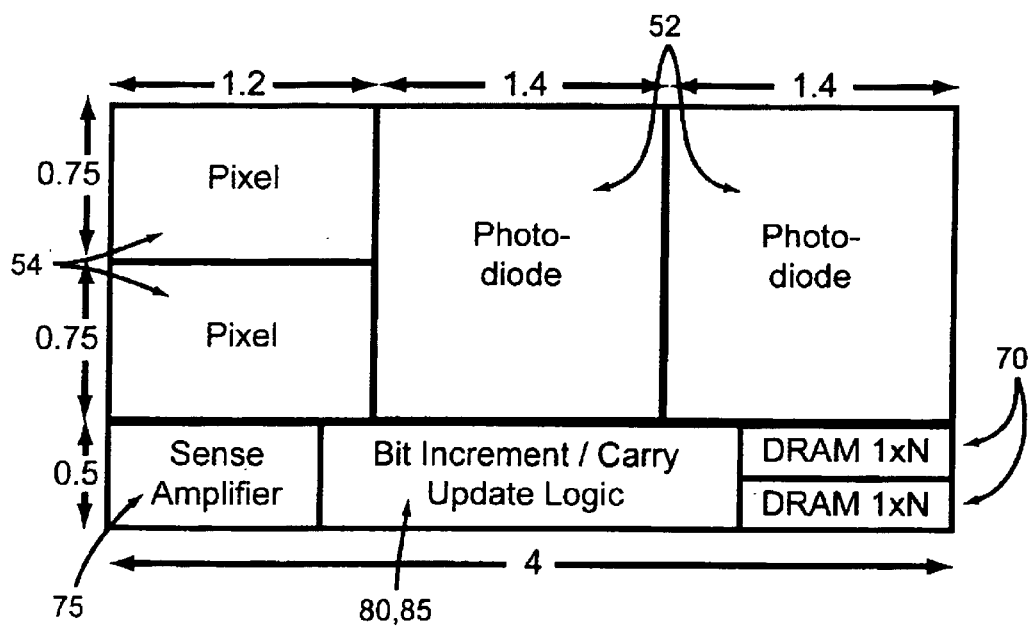
FIG. 22 is a diagram illustrating how the different cells of FIG. 20 are rescaled and arranged in a two-dimensional, single-layer layout.

In the 3-layer 3D layout, the cells are overlaid as shown in FIG. 21. In 2D, since all of the cells must reside on the same substrate, the effective array unit cell is necessarily larger than the pixel cell pitch. FIG. 22 shows how the different cells are rescaled and arranged to occupy a 2×4 rectangle containing 2 pixels in the 2D layout. This sizing results in an effective unit cell size of 2×2 for the 2D array, or twice the linear dimensions (4× the area) of the 3D cell.

Every two pixels 54, in both 2D and 3D layouts, share a single processing circuit 56 (i.e., sense amplifier/bit-slice processor unit). However, each pixel 54 is not necessarily served by the processing circuit closest to it. Multiple rows of N-bit DRAM 70 are obtained in a single memory block by abutting instances of the 1×N cells shown in FIGS. 9 and 10. In this configuration, all rows share the same word lines, and thus it is important that they all be driven by a sense amplifier circuit 75 at the same time. If not, data will be lost on any cells connected to floating data lines when the word line is pulsed high.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A pixel processing and storage cell for use with a plurality of like cells in an integrated circuit imaging array, with each cell adapted to be coupled to a sensing unit having a binary output signal, the cell comprising:
   a digital arithmetic logic processing circuit adapted to receive and process the output signal of an associated sensing unit to a processed multi-bit value, the processing circuit including a sense amplifier, and
   a memory circuit including a plurality of bit storage units for storing processed values and coupled to the sense amplifier for use with the processing circuit during arithmetic logic processing.

2. The pixel processing and storage cell of claim 1, wherein the memory circuit includes refreshable DRAM memory.

3. The pixel processing and storage cell of claim 2, wherein each storage unit is a single-transistor unit.

4. The pixel processing and storage cell of claim 1, wherein the processing circuit includes logic for effecting multi-bit analog-to-digital conversion of the output signal.

5. The pixel processing and storage cell of claim 1, wherein the processing circuit includes bit-slice logic and carry update logic.

6. The pixel processing and storage cell of claim 1, wherein the cell is implemented on at least one CMOS substrate.

7. A pixel capture cell for use with a plurality of like cells in an integrated circuit imaging array, with each cell adapted to be coupled to an electromagnetic sensor, the pixel capture cell comprising:

a pixel transducing circuit for receiving a sense signal from an associated electromagnetic sensor and generating a binary output signal, a digital arithmetic logic processing circuit coupled to the pixel transducing circuit and adapted to process the binary output signal to a processed multi-bit value, the processing circuit including a sense amplifier, and a memory circuit including a plurality of bit storage units for storing processed values and coupled to the sense amplifier for use with the processing circuit during arithmetic logic processing.

8. The pixel capture cell of claim 7, wherein the pixel transducing circuit is a voltage mode circuit which measures the amount of charge accumulated in a predetermined time period.

9. The pixel capture cell of claim 7, wherein the pixel transducing circuit is a time-based circuit which measures the integration time required for the sense signal voltage to reach a predetermined reference level.

10. The pixel capture cell of claim 7, wherein the pixel transducing circuit includes an oscillator which generates output pulses.

11. The pixel capture cell of claim 7, wherein the pixel transducing circuit includes a comparator.

12. The pixel capture cell of claim 7, wherein the memory circuit includes refreshable DRAM memory.

13. The pixel capture cell of claim 7, wherein the processing circuit includes logic for effecting multi-bit analog-to-digital conversion of the output signal.

14. The pixel capture cell of claim 7, wherein the cell is implemented on a CMOS substrate.

15. The pixel capture cell of claim 7, wherein the cell includes a plurality of pixel transducing circuits coupled in multiplex fashion to the processing circuit and the memory circuit.

16. A pixel imaging cell for use with a plurality of like cells in an integrated circuit imaging array, the pixel imaging cell comprising:

an electromagnetic sensor producing a sense signal in response to sensed electromagnetic radiation, a pixel transducing circuit coupled to the sensor for receiving the sense signal and generating a binary output signal, a digital arithmetic logic processing circuit coupled to the pixel transducing circuit and adapted to process the binary output signal to a processed multi-bit value, the processing circuit including a sense amplifier, and a memory circuit including a plurality of bit storage units for storing processed values and coupled to the sense amplifier for use with the processing circuit during arithmetic logic processing.

17. The pixel imaging cell of claim 16, wherein the sensor is a visible light sensor.

18. The pixel imaging cell of claim 17, wherein the sensor is a photodiode.

19. The pixel imaging cell of claim 16, wherein the sensor is a non-visible radiation sensor.

20. The pixel imaging cell of claim 19, wherein the sensor is an X-ray sensor.

21. The pixel imaging cell of claim 19, wherein the sensor is an infrared photo detector.

22. The pixel imaging cell of claim 19, wherein the sensor is a micro-machined, solid-state detector for microwave or millimeter-wave radiation.

23. The pixel imaging cell of claim 16, wherein the cell is implemented on at least one CMOS substrate.

24. The pixel imaging cell of claim 23, wherein the cell is implemented in plural layered CMOS substrates such that the sensor is disposed on a first substrate and the transducing circuit is disposed on a second substrate and the processing and memory circuits are disposed on a third substrate.

25. An integrated circuit imaging array comprising:

a plurality of electromagnetic pixel sensors disposed in an image sensor array and each producing a pixel sense signal in response to sensed electromagnetic radiation, a plurality of pixel transducer circuits respectively coupled to the sensors and each receiving a pixel sense signal and generating a binary output signal, a plurality of digital arithmetic logic processing circuits coupled to the pixel transducer circuits on a pixel-parallel basis wherein each processing circuit is coupled to N transducer cells where $N \geq 1$, each processing circuit including a sense amplifier and being adapted to process binary output signals to processed multi-bit values, and a plurality of memory circuits each including a plurality of bit storage units for storing processed values and coupled to the sense amplifiers for use with the processing circuits during arithmetic logic processing.

26. The imaging array of claim 25, wherein the sensors and the circuits are arranged in a two-dimensional array.

27. The imaging array of claim 26, wherein the two-dimensional array includes a plurality of array unit cells, each array unit cell including N sensors, N pixel transducer circuits, N memory circuits and n processing circuits, wherein n<N.

28. The imaging array of claim 27, wherein N=2 and n=1.

29. The imaging array of claim 25, wherein the sensors and circuits are arranged in a three-dimensional, plural-layer array.

30. The imaging array of claim 29, wherein the three-dimensional array includes a first layer comprising the sensors, a second layer comprising the pixel transducer circuits, and a third layer comprising the processing and memory circuits.

31. The imaging array of claim 29, wherein each layer includes a separate CMOS substrate.

32. The imaging array of claim 29, wherein each memory circuit includes at least one DRAM cell.

33. An imaging method comprising:

sensing electromagnetic radiation with a plurality of pixel sensors arranged in an image sensor array, converting the output of each sensor to a binary output signal by means of pixel transducing circuits within the array, processing the binary output signals by means of digital arithmetic logic processing circuits within the array to produce processed multi-bit values, and storing processed values in multi-bit memory circuits within the array and using the memory circuits with the processing circuits during arithmetic logic processing.

34. The method of claim 33, wherein the sensing step includes sensing visible light.

35. The method of claim 33, wherein the converting step is effected by use of an oscillating pixel transducing circuit.

36. The method of claim 33, wherein the converting step includes determining the time required for the voltage of a sensor output to reach a predetermined level.

37. The method of claim 33, wherein each processing circuit cooperates on a multiplex basis with plural transducing circuits and plural memory circuits.

38. The method of claim 33, wherein the sensors and the circuits are implemented on at least one CMOS substrate.

* * * * *